US009936017B2

(12) United States Patent
Golander et al.

(10) Patent No.: US 9,936,017 B2
(45) Date of Patent: Apr. 3, 2018

(54) METHOD FOR LOGICAL MIRRORING IN A MEMORY-BASED FILE SYSTEM

(71) Applicant: NETAPP, INC., Sunnyvale, CA (US)

(72) Inventors: Amit Golander, Tel-Aviv (IL); Yigal Korman, Rehovot (IL)

(73) Assignee: NETAPP, INC., Sunnyvale, CA (US)

( * ) Notice: Subject to any disclaimer, the term of this patent is extended or adjusted under 35 U.S.C. 154(b) by 212 days.

(21) Appl. No.: 14/880,293

(22) Filed: Oct. 12, 2015

(65) Prior Publication Data

US 2017/0104820 A1 Apr. 13, 2017

(51) Int. Cl.
*G06F 15/16* (2006.01)
*H04L 29/08* (2006.01)

(52) U.S. Cl.
CPC ...... *H04L 67/1095* (2013.01); *H04L 67/1097* (2013.01)

(58) Field of Classification Search
None
See application file for complete search history.

(56) References Cited

U.S. PATENT DOCUMENTS 3,167,489 A * 1/1965 Hadjian .................. B23P 15/16 204/281
5,764,903 A * 6/1998 Yu ....................... G06F 11/2071 709/208
6,167,489 A * 12/2000 Bauman .............. G06F 13/4239 711/119
6,389,513 B1 * 5/2002 Closson .............. G06F 12/0813 707/999.008
7,647,449 B1 * 1/2010 Roy .................... G06F 11/2064 711/112
9,047,189 B1 * 6/2015 Gupta ..................... G06F 11/10
2009/0067081 A1 * 3/2009 Sato .................... G06F 11/0727 360/71
2012/0317339 A1 * 12/2012 Gissel ................. G06F 12/0871 711/103
2014/0052913 A1 * 2/2014 Wang .................. G06F 12/0853 711/119
2014/0181323 A1 * 6/2014 Manula ................. G06F 3/0659 710/5
2014/0298078 A1 * 10/2014 Keremane ............... H04L 67/06 714/4.1
2015/0134857 A1 * 5/2015 Hahn ...................... G06F 3/061 710/5
2016/0026605 A1 * 1/2016 Pandit ..................... G06F 15/17 709/212
2016/0085681 A1 * 3/2016 Aya ..................... G06F 12/0246 711/103
2016/0267020 A1 * 9/2016 Wang .................... G06F 12/123

* cited by examiner

*Primary Examiner* — Younes Naji
(74) *Attorney, Agent, or Firm* — Klein, O'Neill & Singh, LLP

(57) ABSTRACT

A method and system for logical mirroring between nodes includes maintaining a log of a state modifying operation received at a memory-based file system of an initiator node; writing attributes of the state modifying operation from the memory-based file system to a target node memory, and using the written attributes to process the state modifying operation at the target node according to the order represented by the log, to obtain logical mirroring between the initiator node and the target node.

17 Claims, 7 Drawing Sheets

METHOD FOR LOGICAL MIRRORING IN A MEMORY-BASED FILE SYSTEM

FIELD

This invention relates to the field of logical mirroring, namely replication of data and metadata from a server with a memory based file system to another node.

BACKGROUND

Due to inherent unreliability of computer systems (from unexpected bugs and power failure to permanent hardware damage), redundancy is employed to assure that data outlives its physical container and remains available. One method for data redundancy is called mirroring, which allows a computer system to automatically maintain multiple copies of data to enable continued processes or quick data recovery even in disaster situations.

RAID (redundant array of independent disks) is a technology that combines multiple disk drive components into a single logical drive for the purposes of data redundancy and/or performance improvement. RAID was designed for a device failure within a server, which is not good enough for many modern clustered systems that require full node redundancy, meaning that data should be available even if the entire server (with the RAIDed disk drives) is inaccessible.

RAIN (redundant array of independent nodes) is a newer technology which similarly to RAID builds a virtual pool of storage devices for redundancy purposes but uses devices located on multiple server nodes, such that in case of a node failure, the lost data is replicated among other RAIN nodes in a cluster to avoid the loss of data from the failed node.

The simplest RAIN version is often implemented with DRBD™, which works in Linux. It is integrated at the block layer, on top of block devices, and mirrors each data block that is written to disk to a peer server node with its own disk drives.

The current solutions enable relatively low latency. However, these solutions are integrated in and designed for block-based storage solutions. In order to work with the current mirroring solutions, a byte-addressable storage media would have to be wrapped with a software layer to simulate a block interface, which is inefficient. Moreover, DRBD™ and similar RAIN solutions were designed with HDD (hard disk drive) and SSD (solid state drive) speeds in mind, and both have much higher write latencies than a high speed network. Finally, the current solutions assume symmetry, i.e. that a persistent device on a first node and a second node are of the same type. DRBD™ will not work efficiently, for example, if the first node uses fast SSDs and the second node uses cheaper HDDs.

Thus, there are no efficient mirroring solutions for memory aware file systems and/or for hybrid storage systems, in which, for example, persistent memory (PM) technology (in which a nonvolatile media attached to the central processing unit (CPU) of the computer may provide low RAM-like latencies) is combined with lower cost traditional block-based storage devices (e.g. SSD or HDD).

SUMMARY

Embodiments of the invention provide a system and method for cost efficient mirroring which can be implemented in memory aware, namely memory-based, file systems.

Memory storage (such as PM) performance is much better than network performance, therefor, networking has to be efficient, being able to mirror byte-granular data (and especially meta-data that tends to be byte granular by nature) rather than block-based storage (such as SSD and HDD) to ensure maximal network utilization.

Methods for mirroring, according to embodiments of the invention, are designed on a system call level, namely, mirroring is part of the file system rather than the block layers under the file system. This enables a more efficient and context-aware mirroring process, as further detailed below.

Embodiments of the invention include receiving a state modifying operation (e.g. a system call) at an initiator memory-based file system and reflecting the operation to a target node to obtain logical mirroring between an initiator node and the target node.

Embodiments of the invention use multiple network channels in parallel to help lower the latency penalty that is associated with networking.

Finally, persistent memory is an expensive resource (typically, an order of magnitude more expensive than SSD). Embodiments of the invention enable tiering down of data less likely to be written at the target node, saving memory space and making the system more affordable.

BRIEF DESCRIPTION OF THE DRAWINGS

The invention will now be described in relation to certain examples and embodiments with reference to the following illustrative figures so that it may be more fully understood. In the drawings.

DETAILED DESCRIPTION

An exemplary system and exemplary methods according to embodiments of the invention will be described below.

Different embodiments are disclosed herein. Features of certain embodiments may be combined with features of other embodiments; thus certain embodiments may be combinations of features of multiple embodiments.

In the following description, various aspects of the present invention will be described. For purposes of explanation, specific configurations and details are set forth in order to provide a thorough understanding of the present invention. However, it will also be apparent to one skilled in the art that the present invention may be practiced without the specific details presented herein. Furthermore, well known features may be omitted or simplified in order not to obscure the present invention.

Unless specifically stated otherwise, as apparent from the following discussions, it is appreciated that throughout the specification discussions utilizing terms such as “processing,” “computing,” “calculating,” “determining,” or the like, refer to the action and/or processes of a computer or computing system, or similar electronic computing device, that manipulates and/or transforms data represented as physical, such as electronic, quantities within the computing system's registers and/or memories into other data similarly represented as physical quantities within the computing system's memories, registers or other such information storage, transmission or display devices.

An exemplary system and exemplary methods according to embodiments of the invention will be described below. For simplicity, Linux semantics are sometimes used to exemplify embodiments of the invention however it should be appreciated that same concepts also apply to other operating systems.

Figure 1A:
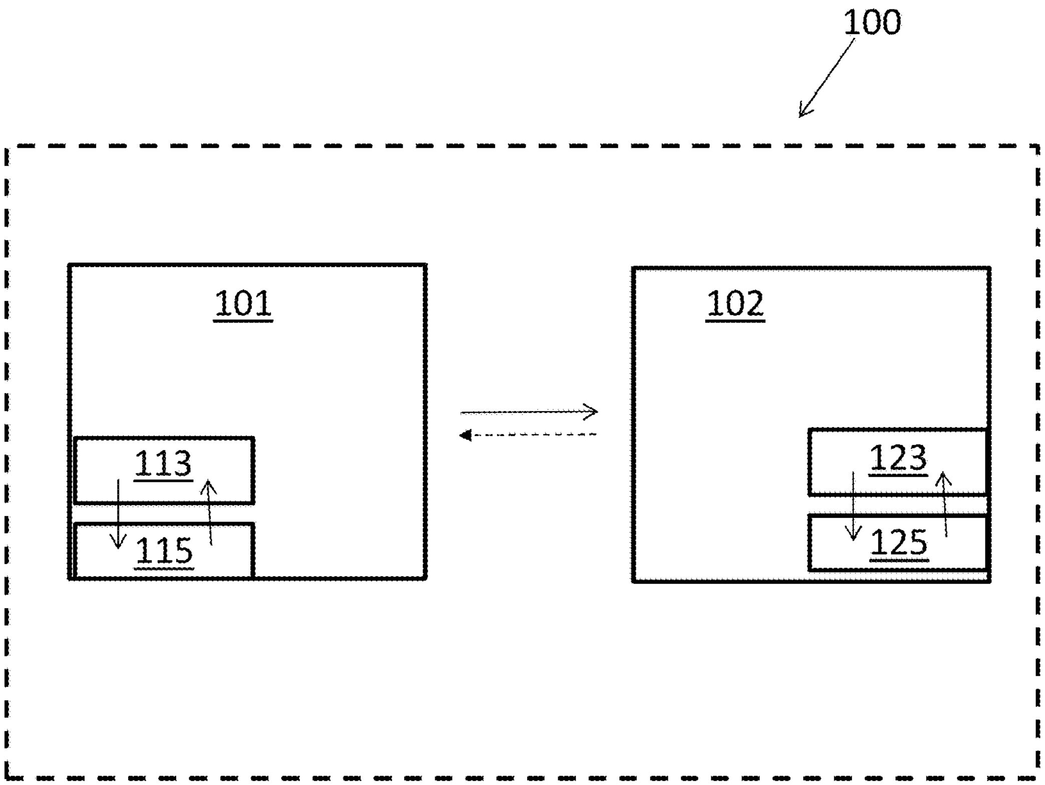
FIGS. 1A and 1B schematically illustrate a clustered system and components of a system according to embodiments of the invention.
Figure 1B:
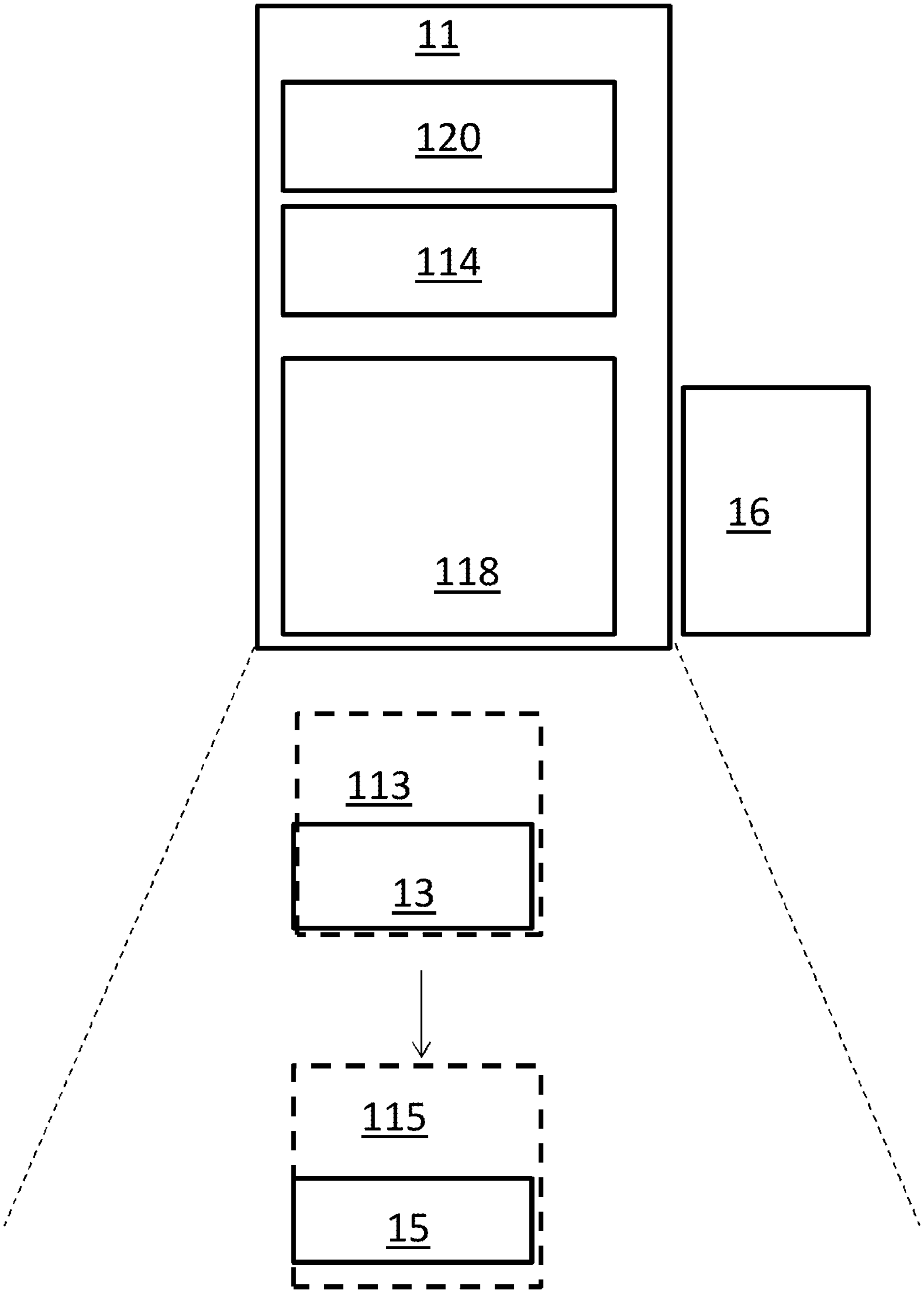

A system according to embodiments of the invention is schematically illustrated in FIG. 1A. The system 100 is typically a clustered system which includes an initiator node, typically an initiator server 101 which includes a memory-based file system (an example of which is schematically illustrated in FIG. 1B) for managing data as well as metadata at the initiator server 101 and a target node, such as target server 102, running a (possibly degraded) file system, which may also be a memory-based file system, for managing data as well as metadata which is stored at the target server 102. In one embodiment data and metadata may be stored in the target server 102 but the file system managing the data and metadata may be run remotely, e.g., from another server.

File systems of an initiator server and a target node may be referred to as initiator file system and target file systems, correspondingly.

Flow of information (typically data, metadata, logs, etc.) from the initiator server 101 to the target server 102 is represented by the solid arrow and flow of information (typically allocations, confirmations, etc.) from the target server 102 to the initiator server 101 is represented by the dashed arrow.

In one embodiment the system 100 includes an initiator server having a memory-based file system for managing data at the initiator server, a target node having a target node memory to keep a logical copy of the data (and possibly metadata) at the target node and an interconnect to enable access from the initiator server to the target node memory. In one embodiment the system includes a first processor (typically associated with the initiator server) to write attributes of a state modifying operation received at the memory-based file system to the target node memory and a second processor (typically associated with the target node) to change the copy of the data at the target node memory, based on the written attributes. An operation (sometimes referred to as a system call) may include library calls, function calls and basically any type of service request.

Some examples of state modifying operations or system calls include msync, write, truncate, rename, remove, mkdir, setattr etc.

As further detailed below, the first processor may maintain a log representing an order of received state modifying operations at the memory-based file system and the second processor is to change the copy of data at the target node memory based on the order represented by the log.

The target node does not typically receive non-state-modifying system calls. Some examples of non-state-modifying system calls include mmap, getattr, close, freeze, read, stat and ls.

In one embodiment, further detailed below, attributes of a state modifying operation or system call include an identifier of a location of an aligned data unit at the target node memory. The first processor may write the data to the aligned data unit at the target node memory.

Thus, attributes (also referred to as metadata) and data are replicated from the initiator server 101 file system to the media and file system of the target server 102, providing a mirroring feature, which includes a copy of the logical representation of at least a subset of the initiator server file system on the target server 102.

In some cases not all of the initiator server 101 data is configured for mirroring (e.g., data with lower availability requirements may not be mirrored), thus it is possible that only a subset of data be mirrored according to embodiments of the invention. In other cases a subset of the initiator server 101 data is configured for triple (or more) copies (e.g., metadata or data with higher availability requirements may be mirrored onto more than one target server 102), thus a second target node may be used for mirroring according to embodiments of the invention.

A system according to embodiments of the invention may include a cluster of nodes. In some embodiments a first subset of data (including metadata) from the initiator server 101 may be mirrored to a first target node and another subset from the initiator server 101 may be mirrored to a second target node, and so on. A complete copy of the initiator server 101 may then be retrieved by reading all the target nodes.

In an initialization phase a target server 102 allocates a memory region for the file system of the initiator server 101, e.g., as described below. In a clustered system, the cluster management assigns one or more target servers 102 per initiator server 101. The assigned target server then allocates typically large memory regions (in one embodiment, persistent memory in the form of Non-Volatile Dual In-line Memory Module (NVDIMM) or Non-Volatile Random-Access Memory (NVRAM), etc.) for the file system of the initiator server 101 to use during the mirroring process according to embodiments of the invention. This is typically done by providing the file system of the initiator server 101 with target addresses, so the initiator file system can use, for example, efficient remote direct memory access (RDMA) to directly write into the target server's 102 memory or storage media.

Upon receiving a state modifying operation (e.g., a system call in a file system using a POSIX interface, or a function call in a file system library), the file system of the initiator server 101 may write a log for the operation and send it (typically in network packets) to the target server 102. The initiator server 101 file system may then request confirmation (also referred to as acknowledgement) from the target server 102. In one embodiment low level acknowledgement may be requested from hardware components of the target node for quick response. For example, low level acknowledgement may be requested by performing a read, typically a zero-size read request to obtain acknowledgement from a networking module at the target node to make sure the network packets arrived safely at the target node, and a non-zero size read request to obtain acknowledgement from the target node to ensure that the data was saved at the target node memory. High level acknowledgement may be requested by performing a read request to the file system of the target.

In some embodiments the initiator node, e.g., initiator server 101, includes an initiator memory based tier where data is stored at the initiator node and the target node includes a target memory based tier, which includes memory resources on the target node, e.g., the target node memory, where a logical copy of the data is stored and a target block based tier in communication with the target memory based tier for accepting a copy of data from the target memory based tier during "tiering down". "Tiering down" relates to a process in which data is copied from a fast access tier to a slower access tier, for example, if and when the fast access tier is about to run out of free space.

Thus, each server in system 100 may include tiers, e.g., tier 113 (fast access tier, typically a memory-based tier)) and 115 (slower access tier) in the initiator server 101 and tier 123 (fast access tier, typically a memory-based tier) and 125 (slower access tier, typically block-based tier) in the target server 102. Tier 113 and/or 123 may typically be located on the memory interconnect (i.e. NVDIMM) or PCIe (Peripheral Component Interconnect Express) interconnect (i.e. NVRAM) between the initiator and target servers.

In one embodiment at least part of the data at the initiator server 101 is stored in an initiator memory-based tier and at least part of the data at the target server 102 is stored in a target memory-based tier.

The fast access tiers at both initiator and target servers (tier 113 and tier 123) do not have to be symmetric in size or connectivity. In one embodiment the target memory-based tier (e.g., tier 123) is of smaller capacity than the initiator memory-based tier (e.g. tier 113).

In one embodiment the file system of the initiator server 101 and file system of the target server 102 may each tier down data independently. For example, the fast and slower access tiers may be maintained in different sizes in the initiator server 101 and the target server 102.

In one example, tier 113 may hold 20% of the capacity of tier 115. However, the economics in the target server 102, which typically does not receive non-state-modifying system calls, are different and a smaller fast access tier may be used. Thus, in one example, the fast access tier in the target server 102 (tier 123) may hold 4% of the capacity of the slower access tier (tier 125) of the target server 102. The slower access tier of the target server 102 may typically be a block based tier in communication with the target memory-based tier for accepting data from the target memory based tier.

A fast access tier is usually an order of magnitude more expensive than the slower access tier. Thus, the independent tiering at the initiator server and target server, which enables a more aggressive tiering down policy at the target server than at the initiator server and thus enables to maintain a smaller fast access tier at the target server, may greatly enhance mirroring efficiency.

FIG. 1B schematically illustrates an exemplary initiator server operable in a system according to embodiments of the invention.

A server, e.g. an initiator server 101, according to embodiments of the invention includes CPU 11 which runs one or more applications 120 that use a memory aware or memory-based file system 118 to store and retrieve data, for example, through a standard interface 114, such as POSIX.

In some embodiments the file system of the target node does not have to support all system calls, or even interface POSIX, Linux VFS etc., so a degraded file system may be used for the target node.

Transmission of metadata and data between an initiator server and a target node is typically through an interconnect connecting a networking module 16 (such as a network interface card (NIC), host channel adaptor (HCA) and/or other peripherals (e.g., cards, chips or on processor module)) at the initiator server and a networking module at the target node.

High speed network and protocols used according to embodiments of the invention typically support RDMA such as in the case of Infiniband, RoCE and iWarp.

The exemplary CPU 11 controls two tiers; 113 and 115, however a node according to embodiments of the invention may include more tiers. A target node (e.g., sever) may operate similarly to the initiator server described in FIG. 1B.

In one embodiment a first tier (e.g., tier 113) is a memory based fast access tier which may include one or more storage devices of the same type. In one embodiment tier 113 includes one or more volatile or persistent memory device(s) 13 (e.g., dual in-line memory module (DIMM), or non-volatile DIMM (NVDIMM) card or brick over silicon photonics or PCIe or InfiniBand or another, possibly proprietary ultra-low latency interconnect), which may also be referred to as persistent memory (PM) or non-volatile memory (NVM).

A second tier (e.g., tier 115) is a relatively slower access tier (could be, for example, a block based tier) which may include one or more storage devices of a different type than the storage devices in tier 113. In one embodiment tier 115 includes a block based storage device 15 (e.g., Flash-based SSD; a local device or a remote device such as "NVMe over fabric").

A fast access storage type device (e.g., memory device 13) may be, for example, 1,000 faster per access than the slower access storage type device or service (e.g., block based storage device 15). The fast access storage type devices are typically more expensive than the slower access type devices, thus, "hot" data (e.g., data requested multiple times within the past minutes) is typically stored in the first, faster access tier (e.g., tier 113) and "warm" data (e.g., data accessed multiple times within the past week) or "cold" data (e.g., data seldom accessed) is typically stored in a second, slower access tier (e.g., tier 115). Data is typically written to the faster access tier (e.g., tier 113 or tier 123), but may be tiered down (copied to a slower access tier (e.g., tier 115 or tier 125)), if and when the faster access tier is about to run out of free space. Data in a memory is managed in typically (but not necessarily) uniformly sized units or blocks, also known as pages. A data unit may include representation of data such as metadata, as well as the data itself.

According to one embodiment, after an initialization phase and allocation of memory regions, file system 118 may receive an operation (e.g. a system call). Some operations (e.g., system calls such as mmap, getattr, close, freeze, read, stat and ls) do not modify the state of the data and metadata and thus do not require any mirroring action. Other operations are state modifying (e.g., system calls such as, msync, write, truncate, rename, remove, mkdir, setattr etc.) In one embodiment, if the operation is a state modifying operation relating to data (e.g., 'write' or 'msync') then that data is sent by CPU 11 to a target node (e.g., target server 102) to obtain mirroring of the data on the target node. The state of the metadata is typically mirrored as well.

CPU 11 or another processor in communication with the initiator server 101 reflects the state modifying operation received at the initiator server memory based file system to the target server 102. A processor on or in communication with the target server 102 is used to process the log of the reflected operation which resides on the target server 102. Processing the log may be done lazily (i.e., not immediately but rather at a later time) and in the order of the log sent from the initiator server.

Reflecting a system call includes writing to the target node (typically to the memory of the target node) data and information such as an operation or system call, its attributes and location or offset of data or a file system object. Attributes of the system call are written directly to the target memory allowing the target file system to delay the processing of the system call and to process the system call at a later time in an order consistent with the log sent from the initiator server. In one embodiment a state modifying system call is reflected, for instance by using a mechanism such as remote procedure call (RPC) to the file system of the target node by CPU 11 so that the file system of the target node may use the reflected system call on the data and metadata stored in the target node.

For example, a system call such as 'truncate' may be accepted at the file system of an initiator node. According to one embodiment the system call and its attributes are reflected to the target node to be processed at the macro level (i.e. high level RPC that resembles the system call). In another example, the initiator node may micro manage the target file system (i.e. by breaking the system call to several low level RPC requests to change the size, recycle pages, change timestamps etc.).

In another example, a 'setattr' system call that changes permissions in an inode structure may be accepted at a file system of an initiator node. An inode is a data structure that exists per file or directory in a file system. Each UUID (universally unique identifier) has its file system wide unique ID number.

Mirroring may be done by sending the new inode (after the metadata change has been processed) to the target node or by reflecting the system call to the target file system so that processing of the metadata may be done at the target file system.

In one embodiment, when a state modifying operation which relates to data is accepted at the initiator server, a repeat cache may be maintained to keep a pointer to an aligned data unit in the target node memory. In this embodiment a first processor (e.g., CPU 11) does not write attributes of a recurring state modifying system call which relates to the data at the aligned data unit and a second processor changes the copy of the data at the target node memory based on the pointer.

In one embodiment CPU 11 or another processor may maintain a network queue-pair (QP) software interface (further detailed below) defining a number of transmit queues at the initiator node (e.g., initiator server 101) to transmit data (and possibly metadata) to receive queues at the target node (e.g., target server 102).

As further detailed below, the processor may calculate a network queue unique identifier based on the file and/or directory unique identifier or based on the parent directory identifier or by other means. For example, some system calls (e.g., setattr) may be calculated to a queue using the file or directory identifier while other system calls (e.g., rename) may be calculated to a queue using the parent directory identifier.

Data and metadata related to multiple files and directories may be sent in parallel through multiple queues to reduce latency.

In some embodiments an initiator server may include several CPUs and the number of transmit queues may be set or defined to correlate to the number of processors in the initiator server.

In one embodiment calculating a network queue unique identifier (#QP) based on a file or directory unique identifier (#iNode) is based on the modulo function, for example, based on the following equation: #QP=Constant_offset+(#iNode modulo number_of QP_logs).

Figure 2A:
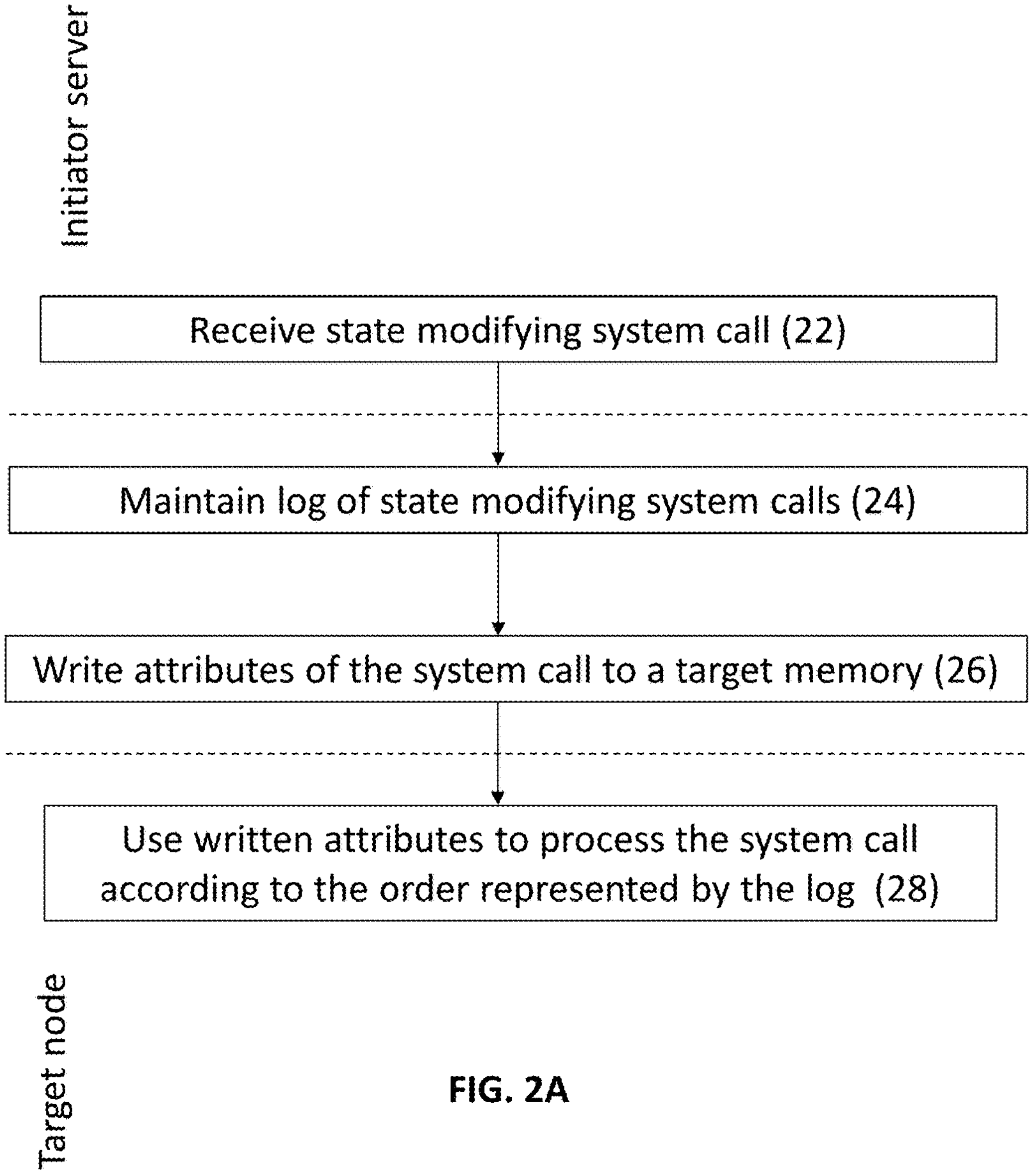
FIGS. 2A, 2B and 2C schematically illustrate methods for mirroring in a memory-based file system according to embodiments of the invention.

A method for mirroring according to an embodiment of the invention is schematically illustrated in FIG. 2A. According to embodiments of the invention a method for mirroring between nodes in a system including an initiator server and a target node, includes the steps of: receiving a state modifying operation (referred to as system call) at an initiator server (22), the initiator server running a memory-based file system; maintaining a log of state modifying system calls (24); writing attributes of the state modifying system call from the memory-based file system to a target node memory (26); and using the written attributes to process the state modifying system call at the target node according to the order represented by the log of state modifying system calls (28), to obtain logical mirroring (of the data and/or associated metadata) between the initiator server and the target node.

Figure 2B:
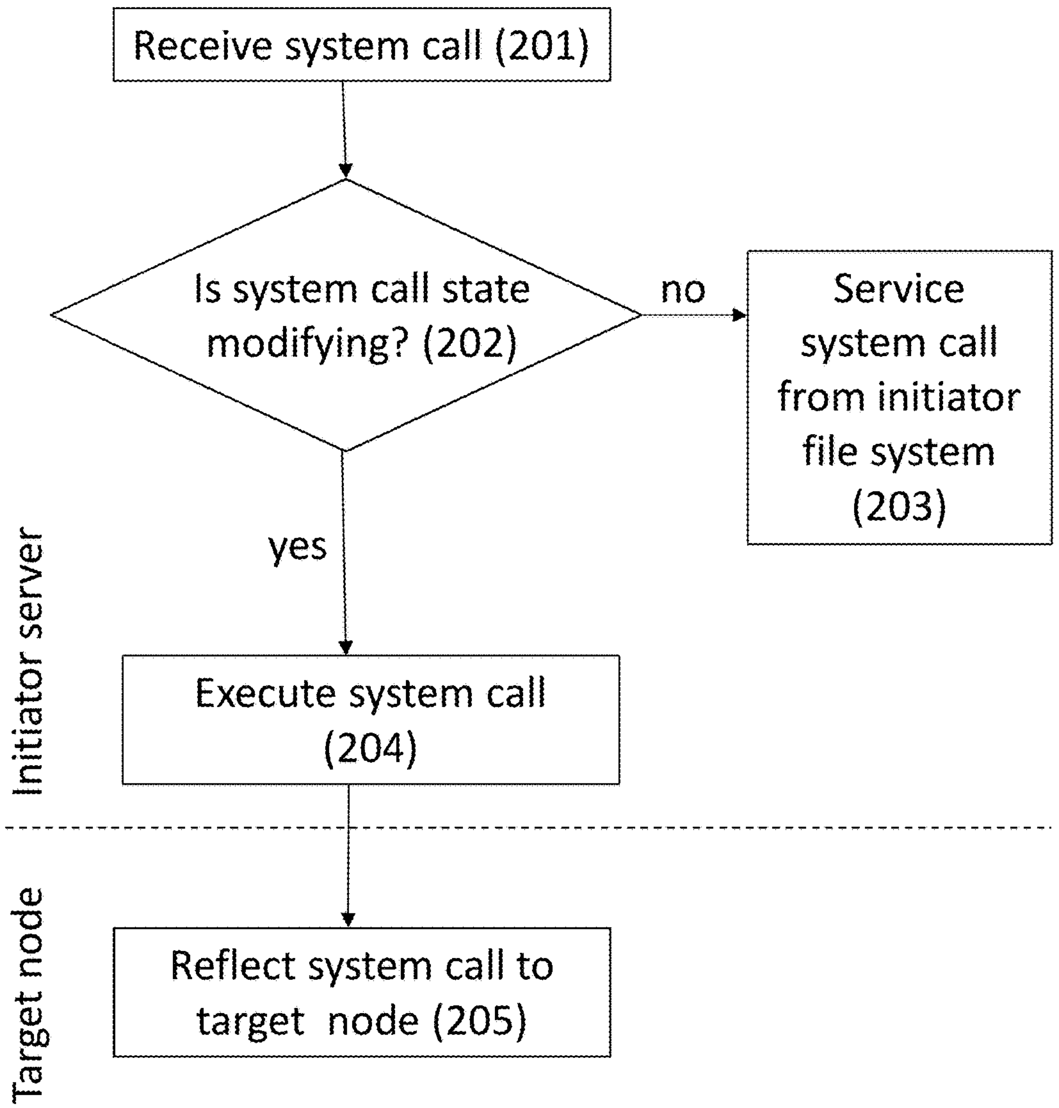

In one embodiment which is schematically illustrated in FIG. 2B, the method includes receiving a system call or operation at an initiator memory based file system (201). If the system call is not a state modifying system call it is only serviced by the initiator memory-based file system (203). If the system call is a state modifying system call it is executed in the initiator file system (204) while being reflected to a target node, e.g., target server (205) to obtain mirroring on the target server.

Thus the method may include determining if a system call received at an initiator file system is a state modifying system call (202), for example by comparing the system call to a predetermined list of system calls. If the system call is not state modifying (e.g., read, mmap, getattr, close, freeze etc. system calls) then the operation is serviced in the initiator file system and no mirroring needs to take place. If the system call is a state modifying system call (e.g., create, open with a create flag (O_CREAT), symlink, link, ulink, write, truncate, rename, remove, mkdir, rmdir, setattr etc.) then the system call is reflected to the target file system on top of being processed and saved in the initiator node. Reflecting the system call is done to obtain mirroring of the data and/or metadata at the target file system.

Most state modifying file system calls, except typical 'write' and msync system calls, imply small changes in terms of the size of payload that has to traverse between initiator and target nodes (e.g., initiator server 101 and target server 102).

Figure 2C:
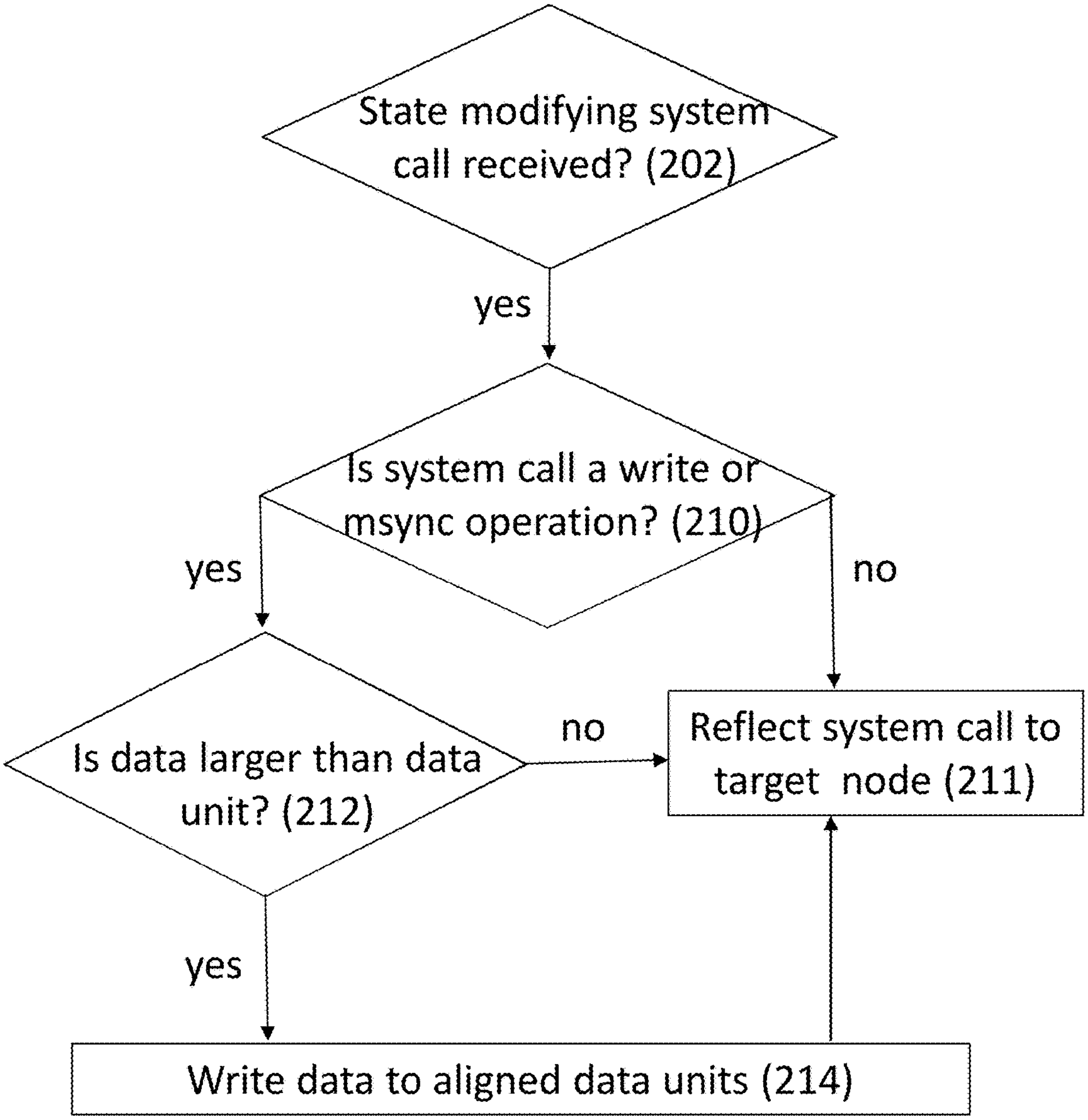

Thus, according to one embodiment, which is schematically illustrated in FIG. 2C, if a state modifying system call is received (202) it is determined if the system call is a write or an msync operation (which typically transfers a greater payload) (210). If the system call is other than a write or msync system call then the operation is reflected to the target node (211) to obtain logical mirroring of the state from the initiator node on the target node. The reflected system call may be applied to the data and metadata saved at the target node, changing the metadata and data to the same state as in the initiator file system.

If the system call is a write operation or an msync operation associated with a memory mapped range of data units that have been written to then it is determined if the data is larger than a predetermined threshold, for example the size of a data unit (e.g., a block or page) of the target node (212). If the data is smaller than the threshold then the operation is reflected to the target node (211). In this case the data may be written to the target node alongside the attributes of the system call, typically the data and attributes being sent together in the same network stream in order to save network packets. The data is later re-copied on the target node to its stable location in the target node.

If the data is larger than the threshold then the data is written to aligned data units (214) (as further detailed below), possibly prior to the operation being reflected to the target node (211). In this case system call attributes may be separated from the data and are typically sent in different packets to different target addresses. The operation or system call may be reflected to the target node after, before or in parallel to RDMA writing the data to aligned data units at the target node, typically to the fast access memory based tier of the target node, using the same or different queue pairs. For example, the reflected operation or system call and a pointer or offset or identifier to the data may be sent to the target file system so that the data written to aligned data units at the target node can be pointed to by the target file system metadata, typically when the reflected operation is processed at a later time. This method advantageously enables mirroring by pointing to the original target address rather than re-copying data at the target node.

Figure 3A:
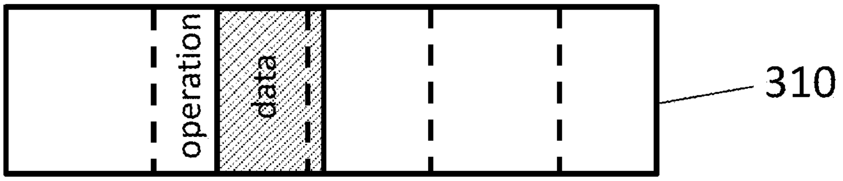
FIGS. 3A, 3B and 3C schematically illustrate methods for writing data to the target node according to embodiments of the invention.
Figure 3B:
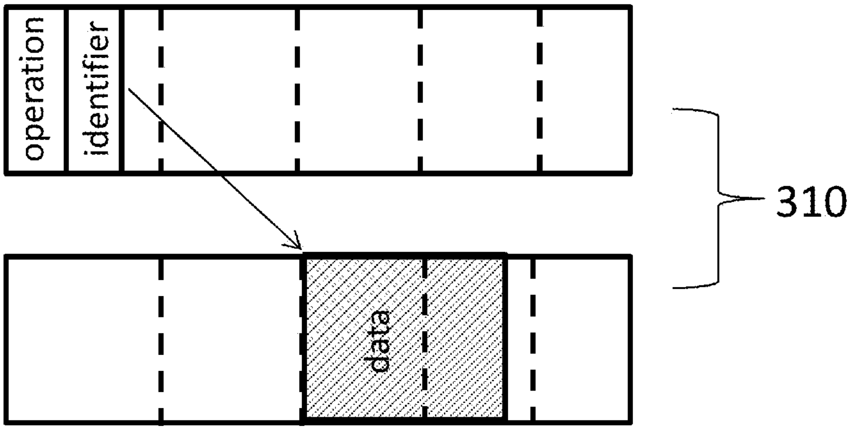
Figure 3C:
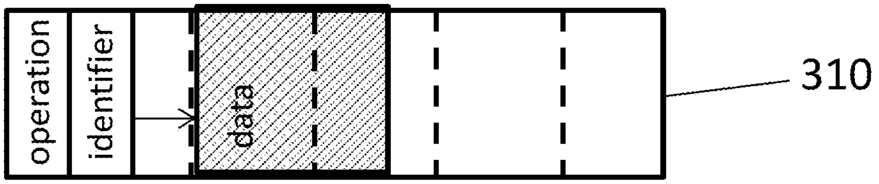

Embodiments of the invention, schematically illustrated in FIGS. 3A, 3B and 3C describe several options of writing data to the target node.

FIG. 3A schematically shows a memory space 310 on the target node that is allocated to the initiator server and is typically accessed as a data stream.

If the data is small, e.g., smaller than the size of an aligned data unit defined by dashed lines then the data can be written, typically as an append to a log, along-side the operation (e.g. a write RCP command) that defines the location of the data (i.e. which file and to what offset to write). Once a state modifying system call is received the log update can be copied to the target file system with minimum latency as a single efficient networking packet. The data is typically later re-copied on the target node.

However, as schematically shown in FIG. 3B, if the data is large in size, (e.g., larger than an aligned data unit when taking its offset into account and thus contains at least one full page of data), then the full pages are not written along-side the operation, but instead a full page is written to a new page (thus aligning the data) that can later be integrated by the target file system, without re-copying the data itself. An identifier (represented by the arrow) to the location of the aligned data (e.g., an offset that can help calculate a target memory pointer) is written along-side the reflected operation. The new page may be located in another network stream, namely sent through multiple QPs (as in FIG. 3B) or in the same network stream, namely sent through the same QP (as in FIG. 3C).

In one embodiment, schematically illustrated in FIG. 3C, the new page is the next available data unit. This saves the need to save a pointer or offset. The identifier in this case may be a mark such as a flag, which consumes fewer bits, and signals the target file system to expect the data (or the rest of the data) to be available at the next data unit or units.

In both options illustrated in FIG. 3B and 3C data can be pointed at and need not be re-copied at the target server, thus eliminating unnecessary copying at the target server.

Typically, the initiator file system sends the log and data using an efficient RDMA protocol, which allows the initiator to write data to the target's memory address space without involving the target server's CPU in the data path.

In some embodiments the method includes keeping a pointer to a data unit in the target node in a repeat cache at the initiator node and upon a recurring write request at the initiator node, updating the data in the target node using the pointer.

In one embodiment the method may include, when receiving at the initiator node a state modifying operation relating to data, maintaining a repeat cache at the initiator server for a pointer to an aligned data unit in the target node memory (where the data is kept). Upon receiving at the initiator memory-based file system a recurring state modifying operation, which relates to this data, updating the data in the aligned data unit in the target node memory without writing the identifier to the location of the aligned data unit at the target node memory.

The pointer may then be invalidated when the data is moved from a fast access tier of the target node to a slower access tier of the target node. The target file system may run a protocol to invalidate such a pointer, for instance, when the operation is processed at the target node (e.g., when the data is moved from a fast access tier of the target node to a slower access tier of the target node).

Pointers in such a repeat cache may also be implicitly invalidated as a result of allocating or freeing new chunks of target memory (i.e. 64 MB chunks). Upon a recurring write or msync system call to an overlapping offset in the same file, the target address is looked up and the initiator file system updates the data (i.e. in place). This method can reduce the amount of data in the log and enable more efficient repeated write operations.

Requesting acknowledgement from the target node file system may be done to ensure that a first state modifying operation has been processed at the target node prior to writing attributes of a second state modifying operation. However, in some embodiments of the invention, the initiator file system does not wait for an acknowledgment from the target file system until the last data unit related to the system call is sent, thereby enabling processes at the initiator file system to continue with minimum latency.

Figure 4:
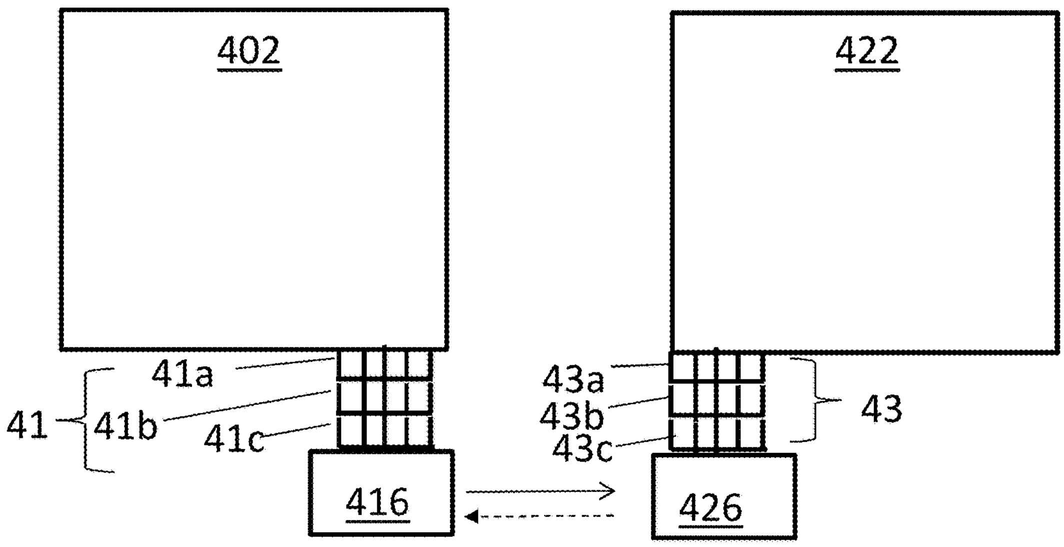
FIG. 4 schematically illustrates a method for mirroring using parallel network queue pairs (QPs), according to an embodiment of the invention.

In one embodiment which is schematically illustrated in FIG. 4, a plurality of queue pairs (QPs) are used for a more efficient mirroring process.

In one embodiment the method includes receiving a plurality of state modifying system calls at the a memory-based file system and maintaining a plurality of transmit queues at the initiator server, each transmit queue having a unique identifying number and each transmit queue to transmit attributes of a different state modifying system call from the plurality of state modifying system calls to a receive queue from a plurality of receive queues at the target node. In this embodiment parallel processing of operations is enabled, reducing latency and increasing efficiency.

A state modifying system call may be mapped to a transmit queue by using a function on a unique identifying number of the file, directory or parent directory, as described above.

In one embodiment an initiator node 402 includes a memory-based file system. A networking module 416 which may include a NIC, HCA, and/or other peripherals (e.g., cards, chips or on processor module) at the initiator node 402 enables communication with a target node 422 through a networking module 426 at the target node 422. Several, typically RDMA-based networking technologies may be used, for example, Infiniband, iWarp and RoCE. The software interface is typically a network queue-pair (QP) that guarantees an efficient in-order transmission for its own data. Other cards and hardware and software protocols may be used for communication between the initiator node 402 and the target node 422.

Data and metadata in the initiator node 402 and other information such as pointers may be kept in memory/storage devices, typically in a fast access tier, and/or in caches in initiator node 402. Data and metadata being mirrored will typically be copied from the initiator node 402 to the target node 422.

Following a state changing system call, a log including operations and/or data and/or metadata and/or pointers may be sent through a QP, which includes a transmit queue 41 managed by initiator node 402 file system and a corresponding receive queue 43 managed by target node 422 file system. Following a state modifying system call the log/s and/or data and/or information are placed in transmit queue 41 and may then be sent according to embodiments of the invention from the transmit queue 41 to the receive queue 43.

In some embodiments the initiator node 402 file system guarantees, possibly by requesting an acknowledgement, that operations, data, metadata, pointers and the like that were placed on transmit queue 41, have at least arrived safely at receive queue 43, if not to a memory (e.g., to a persistent memory based tier) in the target node 422. Such an acknowledgement is typically beyond the scope of networking module 416, but can be achieved by sending an RDMA read request from the initiator node 402. The requested read size may be zero (e.g., for guaranteeing that data reached networking module 426, or an actual size (e.g. single byte to a memory device in the target node 422) to ensure that the previously transmitted data (on the same QP) has left networking module 426 and has probably arrived at a memory based tier in target node 422.

In some embodiments, for some state modifying system calls a higher level acknowledgement from the target node file system may be required. For example, a higher level acknowledgement may be required for order-critical operations, e.g., operations relating to directories. In one embodiment the method includes receiving an order-critical state modifying operation relating to a directory at the memory-based file system. Attributes of the order-critical state modifying operation are written from the memory-based file system to the target node memory and acknowledgement (e.g., higher level acknowledgement as described above) is requested from the target node file system. Acknowledgement may be requested before or after attributes are written to the target node however processing the order-critical state modifying operation at the target node is done after the acknowledgement is received to ensure that processing of one order-critical system call starts only after processing of a previous system call is completed.

For example, in one embodiment the method includes receiving at the memory-based file system a plurality of state modifying operations relating to a directory. A first order-critical state modifying operation is identified from the plurality of operations and a mark is assigned to the directory to block processing of another (second) order-critical state modifying operation which has attributes dependent on the first order-critical state modifying operation, until the first order-critical state modifying operation is processed at the target node.

Requesting higher-level acknowledgment as needed, per operation, enables reducing latency.

In one embodiment a queue managed by the target node 422 file system may be page aligned, i.e., managed as aligned data units. A transmitted operation (sent via the same QP as the data or in another QP) may contain an identifier that the target node 422 file system can use to calculate the memory pointer to the data. In one embodiment, aligned data may be transmitted via one QP, while operations and unaligned data may be transmitted via another QP. This may help avoid fragmentation at the target node.

In one embodiment the transmission of operations and/or metadata may leverage several QPs in parallel, e.g., transmit queues 41*a*, 41*b* and 41*c* corresponding to receive queues 43*a*, 43*b* and 43*c*. Different system calls may be mapped to the different transmit queues to enable parallel processing of operations.

In one embodiment, system calls may be mapped to the different transmit queues 41*a*, 41*b* and 41*c*, by using a hash function on a unique identifying number of the queue, e.g., the unique file or directory inode number. In one embodiment choosing a QP includes using the inode number modulo the number of QPs. In one embodiment the number of QPs defined is set to the number of CPUs in the initiator node in order to avoid lock contention. In another embodiment the number of QPs defined is a power of two (e.g. 32) to enable the modulo function to be implemented as a fast, typically single cycle binary, bitwise AND operation.

Such load balancing ensures that all operations related to a file will reach the target node in the same order as within the initiator node. However, a similar guarantee is not provided for directories. Operations related to a specific directory may exist in multiple QPs because not all related operations are derived from system calls using that specific directory inode number. A directory may have operations related to file and sub directories it contains and those operations would be mapped to QPs according to the inode number of the contained files. Let's assume, for example, that a directory holds two files A and B, and that three in order rename system calls swap the files (A->C, B->A and C->B). If theses system calls are interpreted out of order, for instance starting with B->A or C->B an error will be invoked (i.e. file A already exists and no file C exists).

Thus, in some embodiments when an order-critical operation related to a directory is sent via a QP, the directory is marked, optionally with the relevant QP number. In one embodiment a higher level acknowledgement is requested and once received, clears the mark. In this embodiment all subsequent directory related system calls are blocked from being serviced until the mark is removed. In another embodiment a non-blocking higher-level acknowledgement is requested and when received, clears the mark. The non-blocking higher level acknowledgement ensures that only order-critical directory updates are blocked, allowing non order-critical directory update (for example, a timestamp update) to be serviced even while the directory is marked. After clearing the mark blocked system calls may optionally send an urgent request for higher-level acknowledgement.

In an alternative embodiment, the QP is chosen based on the parent directory inode rather than the file inode. In some embodiments, to avoid congestion, only relevant system calls are attributed to the parent directory inode. Thus, for example, a regular write system call that does not affect the directory will be sent via the file inode calculated QP, but a remove system call to the same file will be sent via the parent directory inode calculated QP.

In cases where order may need to be enforced between QPs, such as when a write operation to a file is followed by the removal request of the file, a similar mechanism of marking and/or asking for higher-level acknowledgement request, as described above, may be used.

Thus, the method according to embodiments of the invention may include maintaining a plurality of logs of state modifying operations and using a plurality of QPs to reduce latency.

Embodiments of the invention provide a system and method which can operate at the file system level in which operations are visible and can be taken into account in determining steps in the mirroring process, providing more efficient systems and methods for mirroring.

Mirroring according to embodiments of the invention may be used advantageously in cases where data redundancy is needed and for high availability purposes.

What is claimed is:

1. A method for logical mirroring between nodes, the method comprising:

receiving a state modifying operation at an initiator server, said initiator server running a memory-based file system;

maintaining a log of state modifying; operations, said log representing an order of received state modifying operations;

writing attributes of the state modifying operation from the memory-based the system to a target node memory of a target node;

using the written attributes to process the state modifying operation at the target node memory according to the order represented by the log, to obtain logical mirroring between the initiator server and the target node;

requesting a first acknowledgement by the initiator server from the target node, where an acknowledge type for the first acknowledgement is based on a type of the state modifying operation and is selected from a first level acknowledgement where the target node only confirms receipt of data from the initiator server and a second level acknowledgement is confirmation that a task preceding the state modifying operation has been completed before the state modifying operation is executed at the target node;

wherein the state modifying operation relates to the data and when the data exceeds an aligned data unit of the target node, then the data is written to the aligned data unit and an identifier is written to a location of the aligned data unit at the target node memory;

maintaining a repeat cache at the initiator server for a pointer to the aligned data unit in the target node memory;

upon receiving a recurring state modifying operation which relates to the data at the memory-based file system, updating the data in the aligned data unit in the target node memory without writing the identifier to the location of the aligned data unit at the target node memory; and invalidating the pointer when the data is moved from a fast access tier of the target node to a slower access tier of the target node.

2. The method of claim 1 wherein the state modifying operation relates to the data and when the data is smaller than the aligned data unit of the target node, then the data is written along the attributes of the state modifying operation.

3. The method of claim 1 wherein the identifier comprises a mark for a file system of the target node to expect the data at a next available data unit.

4. The method of claim 1 and further comprising:

receiving a plurality of state modifying operations at the memory-based file system; and maintaining a plurality of transmit queues at the initiator server, each transmit queue having a unique identifying number and each transmit queue to transmit attributes of a different state modifying operation from the plurality of state modifying operations to the target node.

5. The method of claim 4 and further comprising calculating the unique identifying number of a transmit queue from the plurality of transmit queues based on a file unique identifier or a directory unique identifier.

6. The method of claim 4 and further comprising calculating the unique identifying number of a transmit queue from the plurality of transmit queues based on a parent directory unique identifier.

7. The method of claim 4 and further comprising calculating the unique identifying number of a transmit queue from the plurality of transmit queues using a modulo function.

8. The method of claim 1 and further comprising:

receiving an order-critical state modifying operation relating to a directory;

writing attributes of the order-critical state modifying operation from the memory-based file system to the target node memory;

requesting a second acknowledgement from a target node file system; and processing the order-critical state modifying operation at the target node after the second acknowledgement is received.

9. The method of claim 1 and further comprising:

receiving a first and second order-critical state modifying operation relating to a directory, the second order-critical state modifying operation having attributes dependent on the first order-critical state modifying operation; and assigning a mark to the directory to block processing of the second order-critical state modifying operation until the first order-critical state modifying operation is processed at the target node.

10. A clustered system comprising:

an initiator server having a memory-based file system for managing data at the initiator server;

a target node having a target node memory to keep a logical copy of the data at the target node;

an interconnect to enable access from the initiator server to the target node memory;

a first processor to write attributes of a state modifying operation received at the memory-based file system to the target node memory;

a second processor to change the copy of the data at the target node memory based on the written attributes to obtain logical mirroring between the initiator server and the target node;

wherein the initiator server requests an acknowledgement from the target node, where an acknowledge type for the acknowledgement is based on a type of the state modifying operation and is selected from a first level acknowledgement where the target node only confirms receipt of the data from the initiator server and a second level acknowledgement is confirmation that a task preceding the state modifying operation has been completed before the state modifying operation is executed at the target node;

wherein the first processor maintains a log representing an order of received state modifying operations at the memory-based file system and the second processor changes the copy of data at the target node memory based on the order represented by the log;

wherein the state modifying operation relates to the data and when the data exceeds an aligned data unit of the target node, then the data is written to the aligned data unit and an identifier is written to a location of the aliened data unit at the target node memory;

wherein the initiator server maintains a repeat cache for a pointer to the aligned data unit in the target node memory, and upon receiving a recurring state modifying operation which relates to data at the memory-based file system, updating the data in the aligned data unit in the target node memory without writing the identifier to the location of the aligned data unit at the target node memory; and invalidating the pointer when the data is moved from a fast access tier of the target node to a slower access tier of the target node.

11. The system of claim 10 wherein the attributes comprise an identifier of a location of the aligned data unit at the target node memory and wherein the first processor writes the data to the aligned data unit at the target node memory.

12. The system of claim 10 wherein the initiator server comprises an initiator memory based tier where the data is stored, and the target node comprises a target memory based tier comprising the target node memory where the logical copy of the data is stored, and a target block based tier for accepting a copy of the data from the target memory based tier, wherein the target memory based tier is or a smaller capacity than the initiator memory based tier.

13. The system of claim 10 wherein the first processor maintains a plurality of network queue-pairs to write attributes of a plurality of state modifying operations in parallel from a plurality of transmit queues at the initiator server to a plurality of receive queues at the target node.

14. The system of claim 13 wherein the first processor calculates a unique identifying number of a transmit queue from the plurality of transmit queues based on one or more of a file unique identifier, a directory unique identifier, and a parent directory unique identifier.

15. The system of claim 14 wherein the number of transmit queue is defined to correlate to a number of processors in the initiator server.

16. A non-transitory, machine-readable storage medium having stored thereon instructions for logical mirroring between nodes, comprising machine executable code which when executed by at least one machine, causes the machine to:

receive a state modifying operation at an initiator server, said initiator server running a memory-based file system; maintain a log of state modifying operations, said log representing an order of received state modifying operations;

write attributes of the state modifying operation from the memory-based file system to a target node memory of a target node;

use the written attributes to process the state modifying operation at the target node memory according to the order represented by the log, to obtain logical mirroring between the initiator server and the target node;

request a first acknowledgement by the initiator server from the target node, where an acknowledge type for the first acknowledgement is based on a type of the state modifying operation and is selected from a first level acknowledgement where the target node only confirms receipt of data from the initiator server and a second level acknowledgement is confirmation that a task preceding the state modifying operation has been completed before the state modifying operation is executed at the target node;

wherein the state modifying operation relates to the data and when the data exceeds an aligned data unit of the target node, then the data is written to the aligned data unit and an identifier is written to a location of the aligned data unit at the target node memory;

maintain a repeat cache at the initiator server for a pointer to the aligned data unit in the target node memory;

upon receiving a recurring state modifying operation which relates to data at the memory-based file system, update the data in the aligned data unit in the target node memory without writing the identifier to the location of the aligned data unit at the target node memory; and invalidate the pointer when the data is moved from a fast access tier of the target node to a slower access tier of the target node.

17. The non-transitory machine readable storage medium of claim 16. wherein the machine executable code which when executed by at least one machine, further causes the machine to:

receive an order-critical state modifying operation relating to a directory;

write attributes of the order-critical state modifying operation from the memory-based file system to the target node memory;

request a second acknowledgement from a target node file system; and process the order-critical state modifying operation at the target node after the second acknowledgement is received.

* * * * *